United States Patent
Ghosh et al.

(10) Patent No.: US 9,959,135 B2
(45) Date of Patent: May 1, 2018

(54) PATTERN DESIGN FOR HETEROGENEOUS ENVIRONMENTS

(71) Applicant: International Business Machines Corporation, Armonk, NY (US)

(72) Inventors: Rahul Ghosh, Bangalore (IN); Hugh E. Hockett, Raleigh, NC (US); Aaron J. Quirk, Raleigh, NC (US); Lin Sun, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days. days.

(21) Appl. No.: 15/398,781

(22) Filed: Jan. 5, 2017

(65) Prior Publication Data

US 2017/0116024 A1    Apr. 27, 2017

Related U.S. Application Data

(63) Continuation of application No. 14/847,109, filed on Sep. 8, 2015, now Pat. No. 9,569,249.

(51) Int. Cl.
    *G06F 9/455*    (2006.01)

(52) U.S. Cl.
    CPC .. *G06F 9/45558* (2013.01); *G06F 2009/4557* (2013.01); *G06F 2009/45595* (2013.01)

(58) Field of Classification Search
    CPC .............................. G06F 8/65; G06F 9/45533
    USPC ............................................... 718/1; 717/173
    See application file for complete search history.

(56) References Cited

U.S. PATENT DOCUMENTS

| | | | |
|---|---|---|---|
| 8,209,687 B2 | 6/2012 | Yuyitung et al. | |
| 8,924,539 B2 | 12/2014 | Ferris et al. | |
| 8,984,503 B2 | 3/2015 | Poddar et al. | |
| 9,116,767 B1* | 8/2015 | Arif | G06F 8/60 |
| 2010/0070970 A1 | 3/2010 | Hu et al. | |
| 2013/0232463 A1* | 9/2013 | Nagaraja | G06F 8/61 |
| | | | 717/101 |
| 2014/0229607 A1 | 8/2014 | Jung et al. | |
| 2014/0280805 A1 | 9/2014 | Sawalha | |
| 2015/0019722 A1 | 1/2015 | Narayanan et al. | |
| 2016/0098287 A1 | 4/2016 | Prasad et al. | |
| 2017/0220372 A1* | 8/2017 | Masters | G06F 9/45558 |

OTHER PUBLICATIONS

Ghosh et al.,"Pattern Design for Heterogeneous Environments", Pending U.S. Appl. No. 14/847,109, filed Sep. 8, 2015, pp. 1-24.
IBM Appendix P, "List of IBM Patents or Patent Applications Treated as Related", dated Jan. 5, 2017, 2 pages.

* cited by examiner

*Primary Examiner* — Andy Ho
(74) *Attorney, Agent, or Firm* — Stephen R. Yoder (57) ABSTRACT

A method is provided for designing and optimizing a pattern by considering heterogeneous cloud environments. Building blocks within the pattern can be deployed into different cloud environments and different cloud providers, depending on where the pattern fits users need best. Further, building block configuration within the pattern can be optimized by target environments, along with runtime bursting among multiple environments.

20 Claims, 4 Drawing Sheets

PATTERN DESIGN FOR HETEROGENEOUS ENVIRONMENTS

BACKGROUND

The present invention relates generally to the field of cloud computing and service, and more particularly to virtual machine pattern design.

Cloud computing, often referred to as simply "the cloud," is the delivery of on-demand computing resources—everything from applications to data centers—over the Internet on a pay-for-use basis. The cloud may include a public cloud, a private cloud, and/or a hybrid cloud. A public cloud is owned and operated by companies that offer rapid access over a public network to affordable computing resources. A private cloud is infrastructure operated solely for a single organization, whether managed internally or by a third party, and hosted either internally or externally. A hybrid cloud uses a private cloud foundation combined with the strategic integration and use of public cloud services.

In the cloud computing, a pattern is used to describe cloud service models and cloud deployment types in an abstract form to categorize the offerings of cloud providers. A pattern can be thought of as a recipe that combines all of the knowledge an organization acquired during years of complex infrastructure management tasks for optimizing and automating software deployment. A pattern describes, in a logical way, a repeatable solution that is based on specific sets of virtual images, middleware, applications, and runtime configurations. The result of deploying a pattern is a configured, tuned, and optimized application environment.

SUMMARY

According to an aspect of the present invention, there is a method, computer program product and/or system for pattern design for heterogeneous target environments, the method comprising: receiving a list of target devices for use as potential deployment targets for a set of components of a pattern; identifying, for an individual target device of the list of target devices, a type of hypervisor available on the individual target device; and determining that a target environment including the individual target device is suitable for deployment of the set of components, based, at least in part, on the type of hypervisor available. The pattern is a model of a topology and an application environment.

DETAILED DESCRIPTION

Pattern design that takes into account additional information of heterogeneous pattern deployment targets. Heterogeneous targets for which virtual machine patterns may be designed for deployment include, but are not limited to: on-premise systems, public cloud providers, personal devices, and/or mobile devices. This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
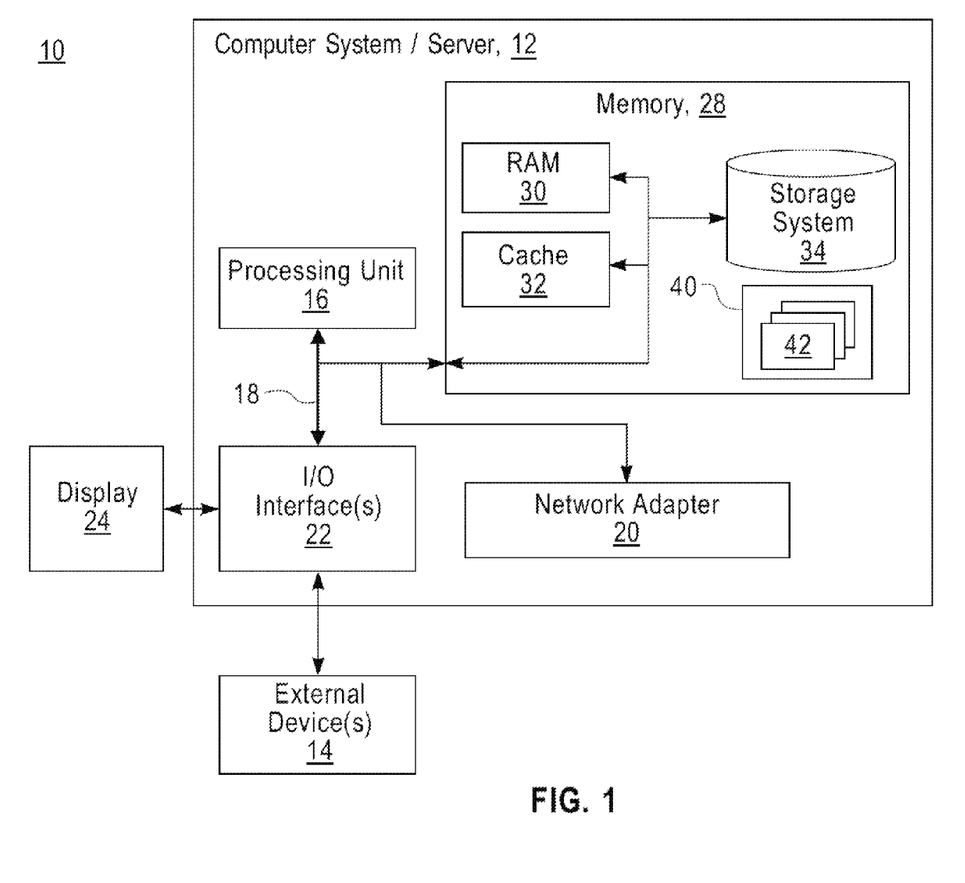
FIG. 1 depicts a cloud computing node used in a first embodiment of a system according to the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
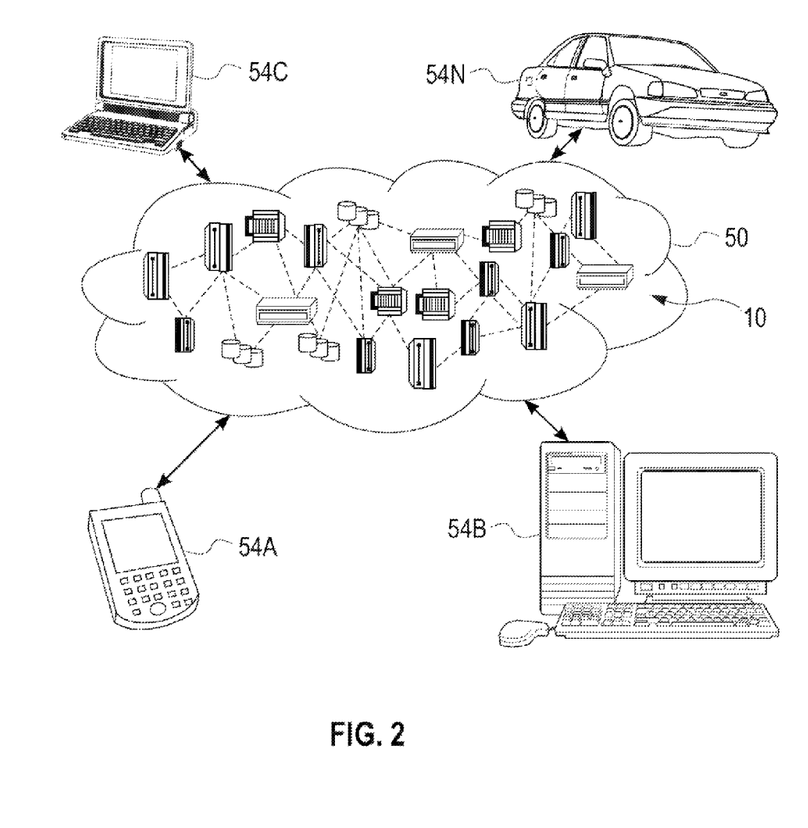
FIG. 2 depicts an embodiment of a cloud computing environment (also called the "first embodiment system") according to the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
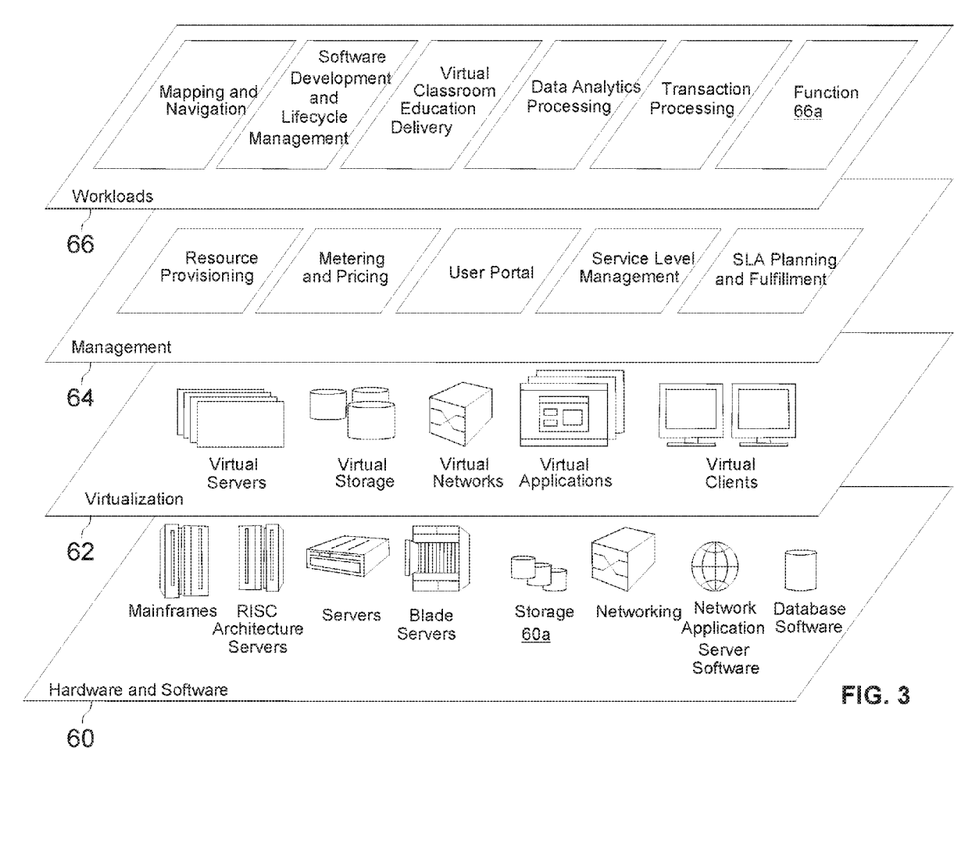
FIG. 3 depicts abstraction model layers used in the first embodiment system.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes; RISC (Reduced Instruction Set Computer) architecture based servers; storage devices; networks and networking components. In some embodiments software components include network application server software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and functionality according to the present invention (see function block 66a) as will be discussed in detail, below, in the following sub-sections of this Detailed description section.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

In a cloud environment, patterns of virtual machines (VMs) significantly simplify the overall life-cycle of the deployed application. Patterns are a template that defines the topology of a complex virtual application. By defining such templates, cloud deployment, scaling, live migration and other operations are highly optimized. From a deployment perspective, patterns can reduce the infrastructure setup time, for example, from several hours/days to few minutes.

Patterns are deployed to target devices. A target device refers to a device that can be used as a deployment target for different components of the pattern, such as a phone device, VM or containers, physical machines, an on-premise system, an off-premise system, a public cloud provider, a server platform, a laptop, and a mobile device.

Conventional pattern technology is unaware of the deployment target. In other words, when a pattern builder/user defines different components of a pattern, the user does not know where virtual machine instances can be deployed using this pattern. Such indifference towards target hardware/hypervisor platform can often times result in sub-optimal pattern design.

For example, a user at a conference wants to give a demo of latest pattern designed at a lab using his phone. A portion of the pattern requires running on a mobile phone while the other portions require running on a back-end server. In such scenario, the portion that is running on the mobile phone needs to be optimized for mobile hypervisors and hardware. An example of such optimization could be judicious resource allocation (e.g., CPU, memory, disk) as the mobile platforms are resource limited.

In this example embodiment, patterns are designed and developed by taking into account additional information of heterogeneous pattern deployment target. Heterogeneous targets may be on-premise systems (e.g. PureApplication System), public cloud providers (including platforms like softlayer, rackspace, aws, and azure), and/or personal/mobile devices. By specifying the target of different pattern components, optimizes the run-time performance (e.g., throughput, and response time) of the VM instances derived from the pattern may be optimizied. Further, choice of deployment platform modulates the other cloud enabled technologies (e.g., auto-scaling, and live migration) that are used in conjunction of a pattern. Further, choice of deployment platform allows a user to see the optimized deployment configuration that fits the deployment platform, such that the user may preview and modify the configuration if needed. (Note: the term(s) "PureApplication", "softlayer", "Rackspace", "aws" and/or "azure" may be subject to trademark rights in various jurisdictions throughout the world and are used here only in reference to the products or services properly denominated by the marks to the extent that such trademark rights may exist.)

Figure 4:
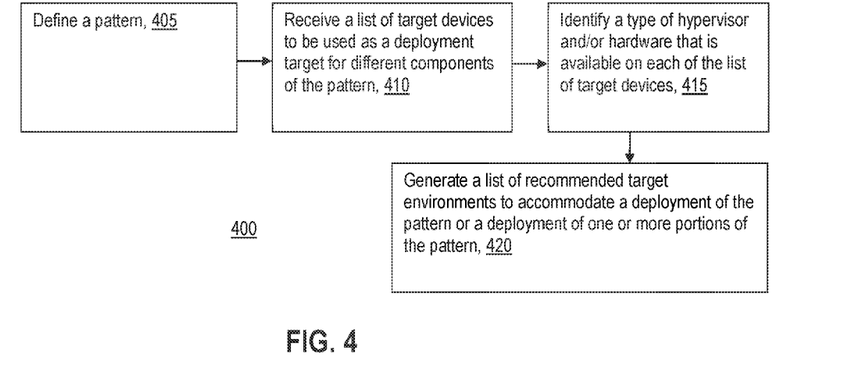
FIG. 4 is a flowchart showing a first embodiment method performed, at least in part, by the first embodiment system.
Figure 5:
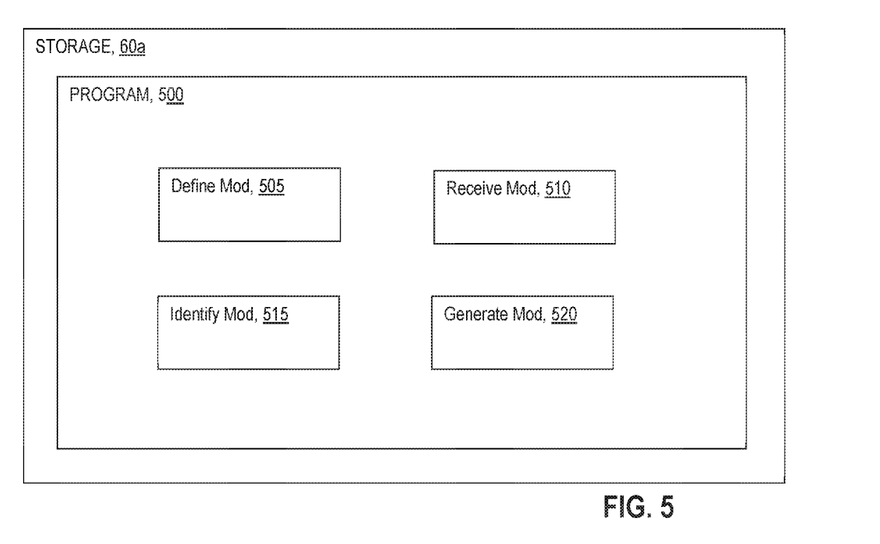
FIG. 5 is a block diagram showing a machine logic (for example, software) portion of the first embodiment system.

FIG. 4 shows flowchart 400 depicting a method according to the present invention. FIG. 5 shows program 500 for performing at least some of the method operations of flowchart 400. This method and associated software will now be discussed, over the course of the following paragraphs, with extensive reference to FIG. 4 (for the method operation blocks) and FIG. 5 (for the software blocks). One physical location where program 500 of FIG. 5 may be stored is in storage block 60a (see FIG. 3).

Processing begins at step 405, where define module ("mod") 505 defines a pattern. In this example, the pattern is a model of a topology and application environment including installation, configuration and management of middleware and applications. In this example, the pattern definition is pre-determined and is received by the define mod. Alternatively, user-input is received by the define mod to define the pattern. In some embodiments, a user-interface (UI) is provided with pre-defined fields to support input of the pattern definition.

Processing proceeds to step 410, where receive mod 510 receives a list of target devices to be used as possible deployment targets for the components of the pattern. In this example, the list of target devices is a set of heterogeneous devices including: an on-premise system, an off-premise system, a public cloud provider, a server platform (with different architectures), a laptop, and a mobile device (e.g., a tablet, and a cell phone). In this example, the list of target devices is specified in a pattern editor (e.g., a graphic editor in pre-configured platform for platform as a service (PaaS) solutions). Alternatively, the list of target devices is specified at a system level by, for example, a cloud administrator.

Processing proceeds to step 415, where identify mod 515 identifies a type of hypervisor and/or hardware that is available on each of the list of target devices. In this example, a hypervisor scan is performed to identify the type of hypervisor that is available on each of these heterogeneous devices (i.e., the list of target devices). The type of hypervisor may include a resource-rich hypervisor including one or more the following: VMware ESXi, PowerVM, and KVM that are suitable for server or laptop environment. Further, the type of hypervisor may include a resource-poor hypervisor including one or more the following: ARM, and VMware Mobile Virtualization Platform. Further, other cloud computing environments related to the deployment target may be scanned. Further, it is determined whether the cloud computing environments are on premise or off premise, and what resources are available. This information is provided to, for example, a cloud administrator, who may modify and/or register additional capabilities of each cloud computing environment based on known limitations and/or capabilities. (Note: the term(s) "VMware ESXi", "PowerVM", "KVM", "ARM", and/or "VMware Mobile Virtualization Platform" may be subject to trademark rights in various jurisdictions throughout the world and are used here only in reference to the products or services properly denominated by the marks to the extent that such trademark rights may exist.)

Processing proceeds to end at step 420, where generate mod 520 generates a list of recommended target environments to accommodate a deployment of the pattern or a deployment of one or more portions of the pattern. As the user deploys the pattern, the list of target environments are generated that can accommodate deployment of the pattern or deployment of portions of the pattern. In this example, the list of recommended target environments is based on the defined pattern and the type of hypervisor and/or hardware. Herein, the target environments refer to the particular types of and hardware corresponding to the various target deployable environments.

III. Further Comments and/or Embodiments

Some embodiments of the present invention comprise selecting one or more environments from the list of recommended target environments and generating a set of configuration recommendations based on the selected one or more target environments. The configuration recommendations may be provided for the resources needed by the virtual machines (VMs) for different target environments.

For example, the same web application server or database server may have different CPU demands based on whether they are deployed on a resource-rich environment or a resource-poor environment. Further, the configuration recommendations may be provided for a prediction made on the quality of a link when the communication link is established between two VMs, for example, the link between a server and a mobile environment might be much weaker than an inter-server links. This is primarily due to the reason that mobile platforms rely on WiFi or cellular networks while server platforms are usually connected by Ethernet. (Note: the term(s) "WiFi" may be subject to trademark rights in various jurisdictions throughout the world and are used here only in reference to the products or services properly denominated by the marks to the extent that such trademark rights may exist.)

Further, the configuration recommendations may be provided when a feedback is provided if the deployed VM on a mobile platform can slow-down the overall system. For example, if a data-intensive applications database is deployed on a mobile platform, storage may turn out to be a bottleneck. Further, the configuration recommendations may be provided for security advice, for example, a sensitive database should not be deployed in a mobile platform and may be defined on premise if that deployment target is available. Further, the configuration recommendations may be provided for additional considerations that are based on the availability of resources such as compute CPU/Memory/IP on each of the deployment targets. That is, the configuration recommendations may be provided based on one or more of the following: resources utilized by virtual machines, quality of a communication link between virtual machines, an effect on performance of a target device, security requirements of components of the pattern, and availability of resources on each of the list of target devices.

Some embodiments of the present invention comprises modifying the defined pattern in response to the set of configuration recommendations. The modifying may include placing one or more virtual machines on different target environments. For example, a user previews a recommended choice of the target environments and further tweaks which VM within the pattern is placed on which target environment. Also, the modifying may include placing one or more virtual machines on different target devices. Further, a user can configure scale-out VM in the future to be placed on a different deployment target than the original placed VM.

In some embodiments of the present invention, IP addresses of the list of target devices are specified or retrieved from one or more databases. Alternatively, IP addresses may be specified at system level by, for example, a cloud administrator.

In some embodiments of the present invention, the list of recommended target environments include one or more of the following: type of platform, type of hypervisor and availability of resources.

Some embodiments of the present invention recognize the following facts, potential problems and/or potential areas for improvement with respect to the current state of the art: (i) conventional pattern technology is unaware of the deployment target, for example, when a user builds a pattern by defining different components of the pattern, the user has no idea where virtual machine instances can be deployed using this pattern; and/or (ii) Such indifference towards target hardware/hypervisor platform can result in sub-optimal pattern design.

Some embodiments of the present invention may include one, or more, of the following features, characteristics and/or advantages: (i) building blocks within a pattern can be deployed into different cloud environments and different cloud provider; (ii) building block configuration within a pattern can be optimized by target environments, along with runtime bursting among multiple environments; (iii) by specifying the target of different pattern components, the run-time performance (e.g., throughput, and response time of VM instances derived from the pattern is optimized; (iv) choice of deployment platform modulates cloud enabled technologies (e.g., auto-scaling, and live migration) that are used in conjunction of a pattern; (v) choice of deployment platform allows users to preview and modify the optimized deployment configuration that fits the deployment platform; (vi) pattern strategy across many cloud products as well as various clouds is enhanced; and/or (vii) borderless cloud strategy can be aligned and matched.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

User/subscriber: includes, but is not necessarily limited to, the following: (i) a single individual human; (ii) an artificial intelligence entity with sufficient intelligence to act as a user or subscriber; and/or (iii) a group of related users or subscribers.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A method comprising:
   receiving a list of target devices for use as potential deployment targets for a set of components of a pattern;
   identifying, for an individual target device of the list of target devices, a type of hypervisor available on the individual target device; and
   determining that a target environment including the individual target device is suitable for deployment of the set of components, based, at least in part, on the type of hypervisor available;
   wherein:
   the pattern is a model of a topology and an application environment.

2. The method of claim 1, wherein the pattern is a pre-defined pattern received from a user.

3. The method of claim 1, further comprising:
   identifying, for the individual target device, a type of hardware available.

4. The method of claim 3, wherein determining that a target environment is suitable for deployment of the set of components, is further based, at least in part, on the type of hardware available.

5. The method of claim 1, wherein:
   the pattern is designed for heterogeneous target environments; and
   the set of components make up a portion of the pattern designed for the target environment.

6. The method of claim 1, further comprising:
   generating a configuration recommendation for the set of components based on the target environment.

7. The method of claim 1, further comprising:
   retrieving an IP address of the target device from a database.

8. A computer program product comprising a computer readable storage medium having stored thereon a set of instructions that, when executed by a processor, cause the processor to determine a target environment for deploying a set of components of a pattern by:
   receiving a list of target devices for use as potential deployment targets for a set of components of a pattern;
   identifying, for an individual target device of the list of target devices, a type of hypervisor available on the individual target device; and
   determining that a target environment including the individual target device is suitable for deployment of the set of components, based, at least in part, on the type of hypervisor available;
   wherein:
   the pattern is a model of a topology and an application environment.

9. The computer program product of claim 8, wherein the pattern is a pre-defined pattern received from a user.

10. The computer program product of claim 8, further causing the processor to determine a target environment for deploying a set of components of a pattern by:
    identifying, for the individual target device, a type of hardware available.

11. The computer program product of claim 10, wherein determining that a target environment is suitable for deployment of the set of components, is further based, at least in part, on the type of hardware available.

12. The computer program product of claim 8, wherein:
the pattern is designed for heterogeneous target environments; and
the set of components make up a portion of the pattern designed for the target environment.

13. The computer program product of claim 8, further causing the processor to determine a target environment for deploying a set of components of a pattern by:
generating a configuration recommendation for the set of components based on the target environment.

14. The computer program product of claim 8, further causing the processor to determine a target environment for deploying a set of components of a pattern by:
retrieving an IP address of the target device from a database.

15. A computer system for pattern design for heterogeneous target environments, the computer system comprising:
a processor set; and
a computer readable storage medium;
wherein:
the processor set is structured, located, connected and/or programmed to run program instructions stored on the computer readable storage medium; and
the program instructions include:
first program instructions programmed to receive a list of target devices for use as potential deployment targets for a set of components of a pattern;
second program instructions programmed to identify, for an individual target device of the list of target devices, a type of hypervisor available on the individual target device; and
third program instructions programmed to determine that a target environment including the individual target device is suitable for deployment of the set of components, based, at least in part, on the type of hypervisor available;
wherein:
the pattern is a model of a topology and an application environment.

16. The computer system of claim 15, wherein the pattern is a pre-defined pattern received from a user.

17. The computer system of claim 15, further comprising:
fourth program instructions programmed to identify, for the individual target device, a type of hardware available.

18. The computer system of claim 17, wherein determining that a target environment is suitable for deployment of the set of components, is further based, at least in part, on the type of hardware available.

19. The computer system of claim 15, wherein:
the pattern is designed for heterogeneous target environments; and
the set of components make up a portion of the pattern designed for the target environment.

20. The computer system of claim 15, further comprising:
fourth program instructions programmed to generate a configuration recommendation for the set of components based on the target environment.

* * * * *